United States Patent [19]

Fischer

[11] Patent Number: 4,497,068
[45] Date of Patent: Jan. 29, 1985

[54] ENCODING SYSTEM FOR OPTIC DATA LINK

[75] Inventor: Kenneth C. Fischer, Milwaukee, Wis.

[73] Assignee: Eaton Corporation, Cleveland, Ohio

[21] Appl. No.: 342,522

[22] Filed: Jan. 25, 1982

[51] Int. Cl.³ .................... H04B 9/00; H03K 13/24
[52] U.S. Cl. ..................... 455/608; 340/347 DD; 455/618; 307/518; 307/234; 328/111
[58] Field of Search ............... 250/551; 455/600–611; 340/347 DD; 360/44; 328/111; 307/518, 234

[56] References Cited

U.S. PATENT DOCUMENTS

| | | | |
|---|---|---|---|
| 2,910,684 | 10/1959 | Jones | 340/347 M X |
| 3,808,366 | 4/1974 | Wanamaker et al. | 375/36 |
| 3,833,901 | 9/1974 | Fowler | 340/347 P |
| 4,184,179 | 1/1980 | Deming | 360/44 |
| 4,258,389 | 3/1981 | Sakamoto | 328/111 X |

FOREIGN PATENT DOCUMENTS 52-72502  6/1977  Japan ..................... 455/609

*Primary Examiner*—T. J. Sloyan
*Attorney, Agent, or Firm*—Andrus, Sceales, Starke & Sawall

[57] ABSTRACT

Encoding circuitry is provided for optic digital data transmission. A transmitter transmits a pair of timed optic pulses of different duration in response to respective leading and trailing edges of a data pulse. A receiver reconstitutes the data pulse by decoding the different duration optic pulse widths. The receiver includes a pulse generator generating a pulse width between that of the pair of transmitted pulses, and compares the generated pulse width against the pulse width then received from the transmitter, for determining positive and negative-going transitions in the reconstituted data stream.

2 Claims, 5 Drawing Figures

ENCODING SYSTEM FOR OPTIC DATA LINK

TECHNICAL FIELD

The invention relates to encoding circuitry for an optic digital data link, including fiber optic transmission. The invention more particularly relates to pulse width modulated transmission of only the edge transitions of the data, and to pulse width decoding reconstituting the data pulse.

SUMMARY

The present invention provides an encoding system for optic transmission of digital data. The system involves the optic transmission of only the transitions of the data. The width of the optic pulse transmitted indicates whether a transition to logic 0 or logic 1 has occurred in the data. A decoder reconstitutes the digital data.

A transmitter is provided for encoding the digital data. In preferred form, a first pulse generator generates a pulse of width T1 in response to a positive data transition. A second pulse generator generates a pulse of width T2, in response to a negative data transition where T2<T1. A light source is driven by the pulse generators and outputs an optic signal of correspondent pulse width.

A receiver is provided for decoding the optic signal to reconstitute the digital data. In preferred form, a light detector receives the optic signal and outputs a correspondent pulse width. A decoder is driven by the light detector and outputs a digital signal transitioning to logic 1 in response to pulse width T1, and transitioning to logic 0 in response to pulse width T2.

The decoder preferably comprises a third pulse generator generating a pulse of width T3, where T1>T3<T2. The decoder further includes a flip-flop clocked by the output of the third pulse generator, and having a data input from the light detector. At the termination of the T3 width pulse, the flip-flop is toggled. Hence, the flip-flop output will go high in response to a T1 pulse since the latter is still present at the termination of the T3 pulse. However, the flip-flop will go low in response to a T2 pulse because the latter will have terminated before the end of the T3 pulse. The digital data is thus reconstituted at the output of the flip-flop.

The invention enables the transmission of DC information without having to DC couple the receiver amplifier. The invention further enables the light source, such as an LED, to operate at a low duty cycle. This in turn allows a higher light output and farther separation between the transmitter and receiver.

DETAILED DESCRIPTION

Figure 1:
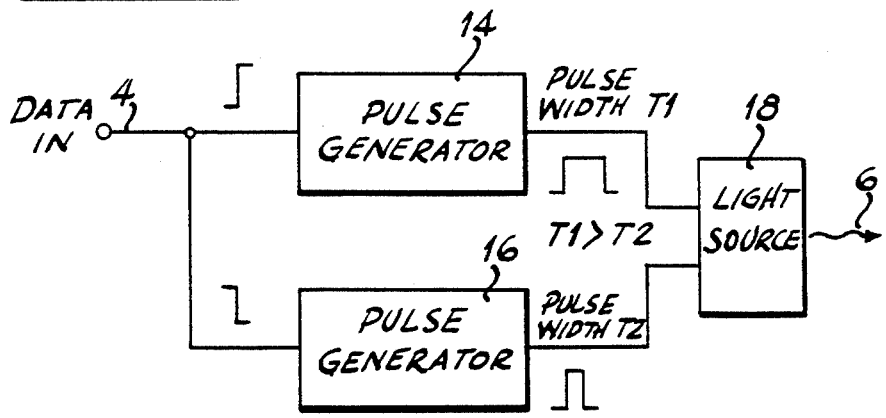
FIG. 1 is a schematic block diagram of a transmitter constructed in accordance with the encoding circuitry of the invention.
Figure 2:
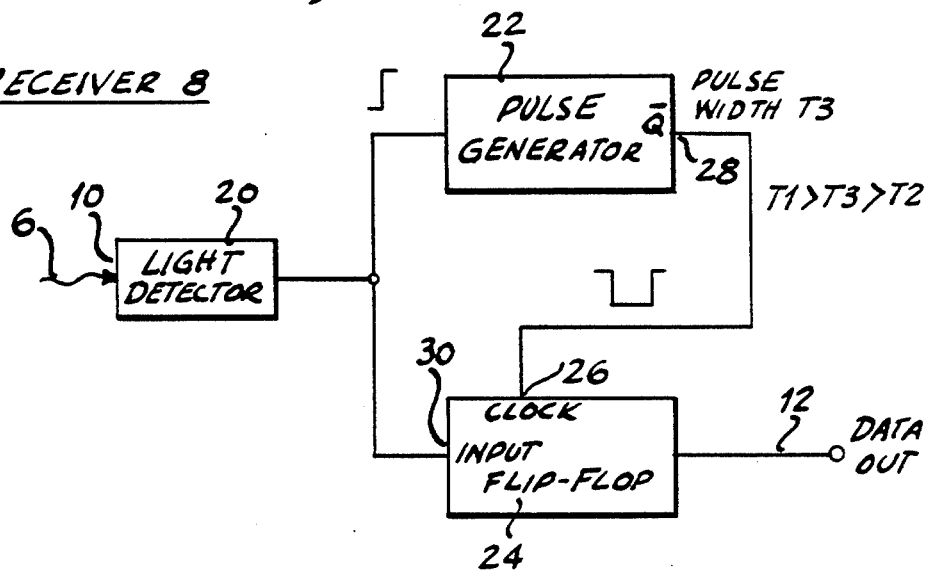
FIG. 2 is a schematic block diagram of a receiver constructed in accordance with the decoding circuitry of the invention.

FIGS. 1 and 2 show encoding and decoding circuitry for an optic digital data link. Transmitter 2 in FIG. 1 receives digital data at input 4. The transmitter outputs an encoded optic signal on optical link 6 such as a fiber optic cable, air, or other light propagating media. A receiver 8 is provided for decoding the optic signal to reconstitute the digital data. Receiver 8 receives the optic signal at input 10 and outputs the decoder reconstituted digital data at output 12.

Transmitter 2 includes a first pulse generator 14 triggered by a rising data edge to output a pulse of width T1. Transmitter 2 includes a second pulse generator 16 triggered by a falling data edge to output a pulse of width T2. Transmitter 2 further includes light source means 18 driven by pulse generators 14 and 16 for outputting an optic signal at 6 of correspondent width T1 or T2.

Receiver 8, FIG. 2, includes a light detector 20 receiving the optic signal and outputting a correspondent pulse width. Receiver 8 further includes decoder means comprising a third pulse generator 22 and a flip-flop 24 driven by light detector 20 and outputting a digital signal at 12 transitioning to one polarity, such as high, in response to pulse width T1, and transitioning to the opposite polarity in response to pulse width T2, whereby to reconstitute the digital data originally input at 4, FIG. 1.

The third pulse generator 22, FIG. 2, is edge triggered by a rising transition of the signal from light detector 20. Pulse generator 22 outputs a pulse of width T3, where T1>T3>T2. Flip-flop 24 compares pulse width T3 against the width of the pulse from the light detector 20 and outputs a data signal at 12. This output data signal transitions to one polarity when the pulse width from light detector 20 is greater than T3 and transitions to the opposite polarity when the pulse width from light detector 20 is less than T3. Flip-flop 24 has a clock input 26 connected to the third pulse generator 22 at an inverting output $\overline{Q}$ 28. The flip-flop has a data input at 30 connected to light detector 20. The termination of the T3 width pulse provides a toggling clock edge at 26, and the signal polarity then present at data input 30 is clocked through flip-flop 24 to the latter's output 12.

If a pulse of width T1 is output by light detector 20 to trigger the third pulse generator 22, then the T1 width pulse will still be present at flip-flop data input 30 when the T3 width pulse terminates. A high polarity state will thus be clocked through flip-flop 24 and hence the flip-flop output 12 will transition to logic 1.

If a pulse of width T2 is output by light detector 20 to trigger the third pulse generator 22, then the T2 width pulse will have ended at the flip-flop data input 30 before the T3 width pulse terminates. A low polarity state will thus be clocked through flip-flop 24 and hence the flip-flop output 12 will transition to logic 0.

Figure 3:
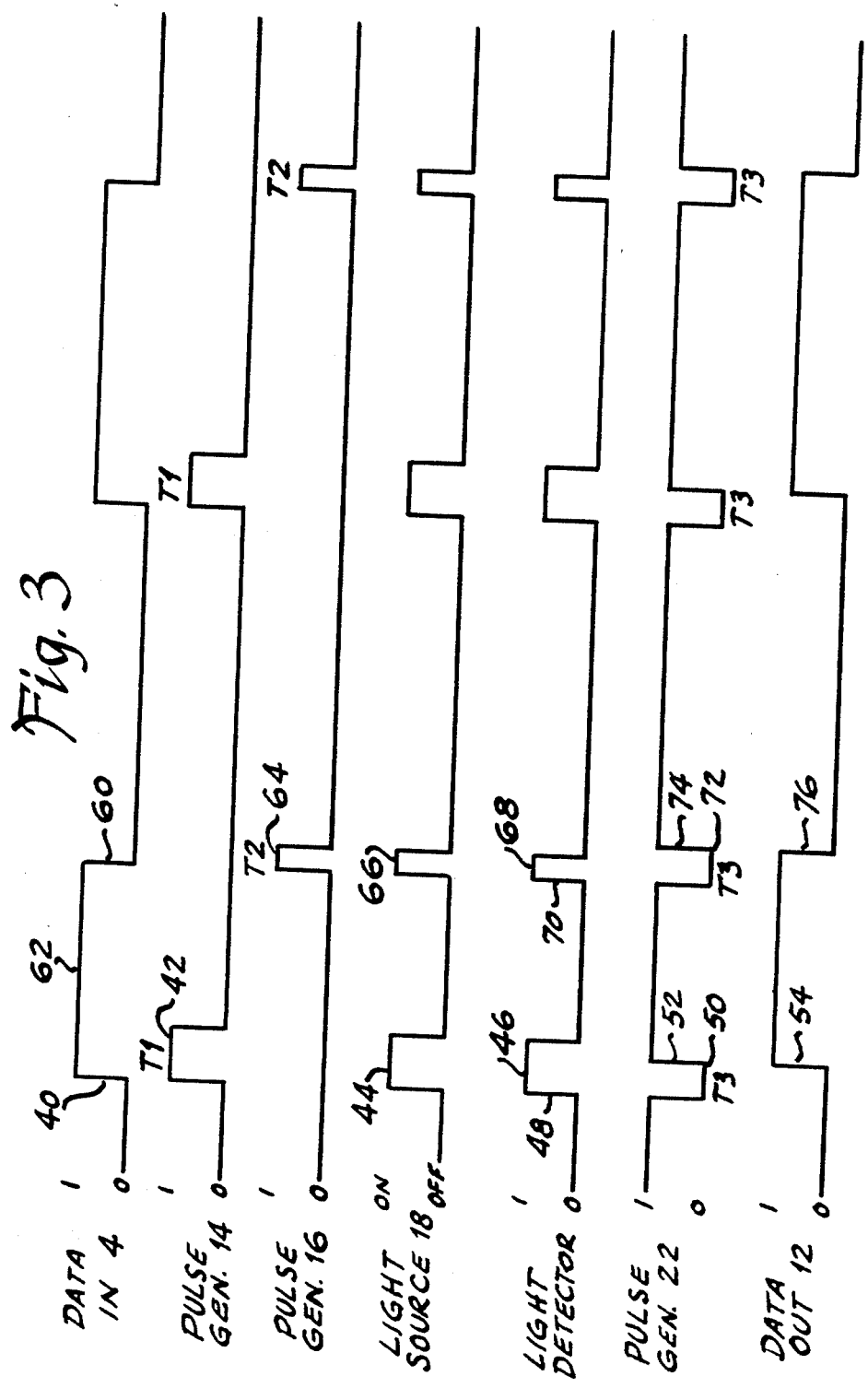
FIG. 3 is a timing diagram illustrating operation of the circuitry of FIGS. 1 and 2.

The operation of the encoding and decoding circuitry of FIGS. 1 and 2 is illustrated in the timing diagram of FIG. 3. The data input to transmitter 2 at input 4 transitions high at 40, which positive-going edge triggers the first pulse generator 14, whereby the latter outputs a pulse of width T1 shown at 42. Pulse 42 from generator 14 drives light source 18 to an ON condition at 44 for a length of time T1 equal to the width of the T1 pulse 42. Light pulse 44 on optic link 6 drives light detector 20 to generate a pulse 46 of the same width T1 as optic pulse 44. The positive-going edge transition 48 of light detector pulse 46 triggers the third pulse generator 22, whereby the latter outputs an inverted pulse 50 of width T3. At the termination of the T3 width pulse 50, its positive-going edge 52 toggles flip-flop 24 at clock input 26 such that the then current data state at input 30 is clocked through to output 12. The then current data state at input 30 is the output state from light detector 20, which is still high as seen at pulse 46. The high polarity state is thus clocked through flip-flop 24, and output 12 transitions high as 54, as triggered at clock edge 52.

It is thus seen that a positive-going data edge transition at the data input 4 causes generation of a T1 width pulse to be output an optic link 6, which in turn causes a positive-going data edge transition on output 12 in the receiver.

Circuit operation will now be described for a negative-going data edge transition at data input 4, such as falling edge 60 at the end of data pulse 62, FIG. 3. Falling data edge 60 triggers the second pulse generator 16 to generate a pulse of width T2 as shown at 64. Pulse 64 drives light source 18 to an ON condition as shown at 66 for a length of time equal to the T2 width of pulse 64. In response to light pulse 66, light detector 20 outputs a signal pulse 68 of width T2. The rising edge 70 of pulse 68 triggers the third pulse generator 22 to generate a pulse 72 of width T3 at its $\bar{Q}$ output 28. At the termination of T3 width pulse 72, rising edge 74 toggles the clock input 26 of flip-flop 24 to clock the then current polarity state at input 30 to output 12. The then current polarity state at input 30 is low because the T2 width pulse 68 from light detector 20 has already terminated and transitioned low. A low polarity state is thus clocked through to output 12 which transitions low at 76.

It is thus seen that a negative-going data edge transition at data input 4 in the transmitter causes generation of a T2 width pulse on optic link 6, which in turn causes a negative-going transition in data output 12 of the receiver, whereby to reconstitute the original digital data input to the transmitter at 4.

Figure 4:
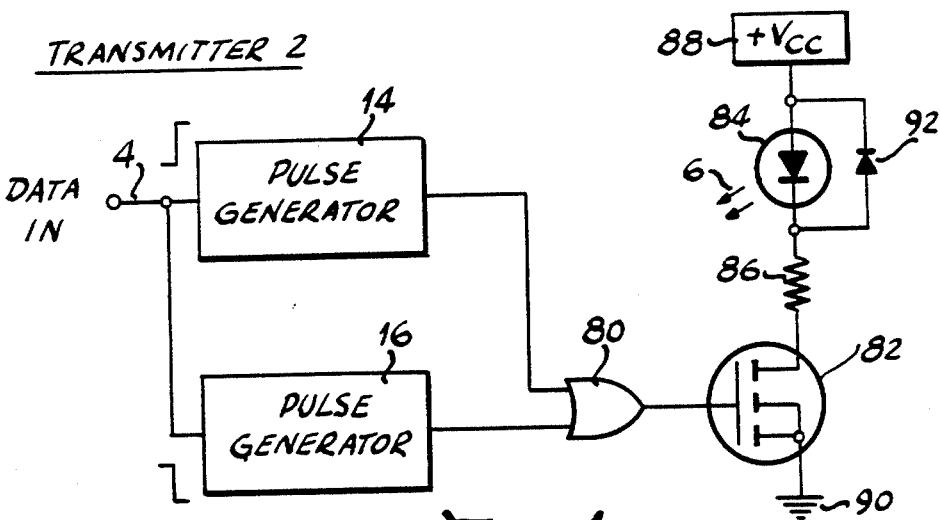
FIG. 4 is a more detailed circuit diagram of the transmitter of FIG. 1.

FIG. 4 shows a more detailed circuit diagram of transmitter 2. Pulse generator 14 is a monostable multivibrator, as is second pulse generator 16. In preferred form, both pulse generators are provided by a dual monostable multivibrator, such as a Signetics 54/74221, with the latter's B1 input providing the positive edge triggering, the A2 input providing the negative edge triggering, and the Q1 and Q2 ports providing the respective outputs. Light source 18 receives the outputs from the pulse generators through an OR gate 80, such as Signetics 54/7486, which in turn drives a transistor, in this case a field effect transistor driver 82 such as a VN10KM. The latter drives a light emitting diode 84, such as Honeywell Optoelectronics SE 3352-003, through a load resistor 86 between a voltage source 88, such as CALEX 21-500, and ground 90. A protective diode 92, such as an 1N4148, may be placed in reverse parallel with LED 84.

Figure 5:
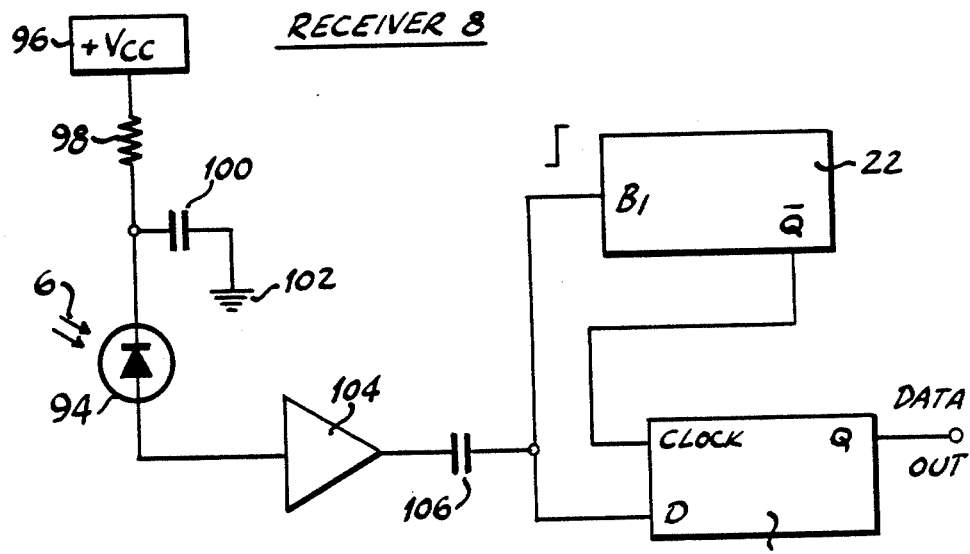
FIG. 5 is a more detailed circuit diagram of the receiver of FIG. 2.

FIG. 5 is a more detailed circuit diagram of receiver 8 of FIG. 2. A photodiode 94, such as Honeywell Optoelectronics SD 3478-002, receives the optic pulses on link 6 and is biased from a voltage source 96, such as CALEX 21-500, through a resistor 98 having a capacitor 100 to ground 102. The signal generated by photodiode 94 is amplified by amplifier 104, such as National Semiconductor LH0082CD, and AC coupled through capacitor 106 to third pulse generator 22 and to the D input of flip-flop 24. Third pulse generator 22 is a monostable multivibrator, such as a Signetics 54/74221 with its B1 port used as the input and its Q1 port as the output. Flip-flop 24 is a type D7474.

It is seen in FIG. 3 that the data output at 12 is an exact reconstituted replica of the data input at 4 but slightly delayed by a small increment.

It is recognized that various modifications are possible within the scope of the appended claims.

I claim:

1. Encoding circuitry for an optic digital data link, comprising:
   (1) a transmitter for encoding digital data, comprising:
      (a) a first pulse generator for generating a pulse of width T1 in response to data state transition of one polarity;
      (b) a second pulse generator for generating a pulse of width T2, where T2<T1, in response to an opposite polarity data state transition; and
      (c) light source means driven by said pulse generators for outputting an optic signal of correspondent pulse width; and
   (2) a receiver for decoding said optic signal to reconstitute said digital data, comprising:
      (a) light detector means for receiving said optic signal and outputting a correspondent pulse width; and
      (b) decoder means driven by said light detector means and outputting a digital signal transitioning to said one polarity in response to pulse width T1, and transitioning to said opposite polarity in response to pulse width T2, whereby to reconstitute said digital data;
   wherein said decoder means comprises:
   a third pulse generator for generating a pulse of width T3, where T1>T3>T2, in response to a given polarity transition of said signal from said light detector means; and
   means comparing pulse width T3 against the width of the pulse from said light detector means and outputting a data signal which transitions to said one polarity when the pulse width from said light detector means is greater than T3, and which transitions to said opposite polarity when the pulse width from said light detector means is less than T3.

2. The invention according to claim 1 wherein said comparing means comprises a flip-flop having a clock input connected to said third pulse generator and having a data input connected to said light detector means, such that the signal polarity at the data input of said flip-flop is clocked through to the latter's output at the termination of said pulse of width T3 from said third pulse generator, whereby
   if a pulse of width T1 is output by said light detetor means to trigger said third pulse generator, then said T1 width pulse will still be present at said flip-flop data input when said T3 width pulse terminates, and said one polarity state will be clocked through said flip-flop and hence said flip-flop output will transition to said one polarity,
   and if a pulse of width T2 is output by said light detector means to trigger said third pulse generator, then said T2 width pulse will have ended at said flip-flop data input before said T3 width pulse terminates, and said opposite polarity state will be clocked through said flip-flop and hence said flip-flop output will transition to said opposite polarity.

* * * * *